United States Patent [19]
Thompson, Jr., Earl B.

[11] 3,717,108
[45] Feb. 20, 1973

[54] CONVERTIBLE RAIL-HIGHWAY MINE CAR

[75] Inventor: Thompson, Jr., Earl B., Fairmont, W. Va.

[73] Assignee: Industrial Pneumatic Systems, Inc., Fairmont, W. Va.

[22] Filed: Nov. 20, 1970

[21] Appl. No.: 91,253

[52] U.S. Cl.................105/215 C, 105/364
[51] Int. Cl........B61d 15/00, B61f 9/00, B62d 61/12
[58] Field of Search............................105/215 C, 364

[56] References Cited

UNITED STATES PATENTS

| | | |
|---|---|---|
| 3,228,350 | 1/1966 | Cox..................105/215 C |
| 3,263,628 | 8/1966 | Grove et al................105/215 C |
| 2,021,075 | 11/1935 | McGinness................105/215 C |
| 1,937,532 | 12/1933 | Ronk..................105/215 C |
| 1,880,126 | 9/1932 | Fageol................105/215 C X |
| 2,140,421 | 12/1938 | Fageol................105/215 C |
| 3,353,504 | 11/1967 | Kersey et al...............105/215 C |

Primary Examiner—Gerald M. Forlenza
Assistant Examiner—Howard Beltran
Attorney—Frederick B. Ziesenheim and Buell, Blenko & Liesenheim

[57] ABSTRACT

A rail mine car having rail wheels for operation on rails is provided with a pair of road wheels on each side which may be lowered into contact with the ground for road operation or raised out of ground contact for operation on the rail wheels. The pair of wheels on each side are journalled on a pair of levers, one end of each lever being supported on a support member in either position of the road wheel, with a locking member holding the support member in position. A force applying mechanism is connected between the two levers for raising the wheels off the ground to allow rail operation.

5 Claims, 4 Drawing Figures

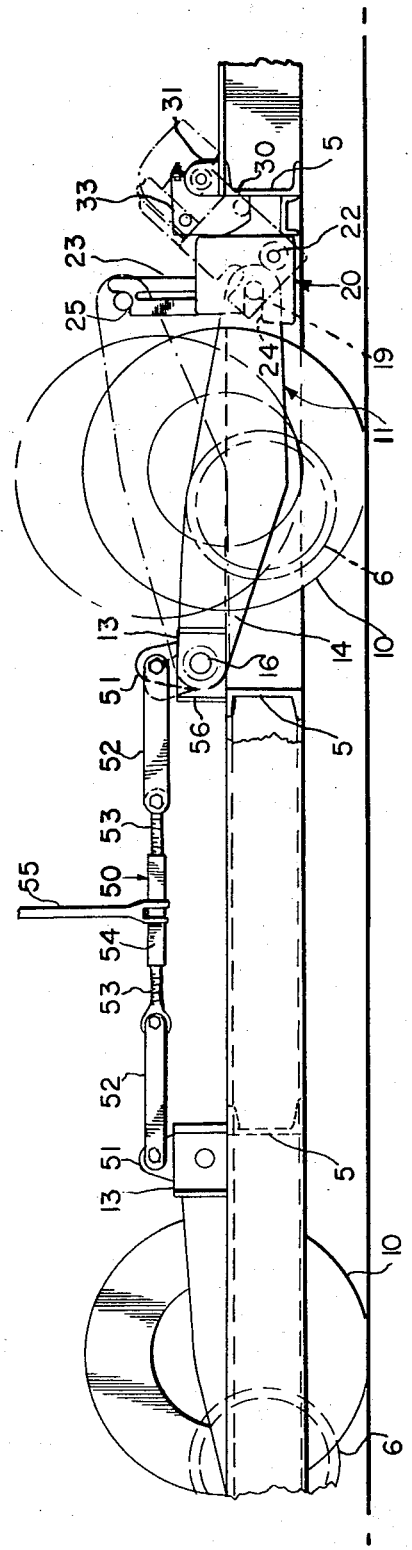
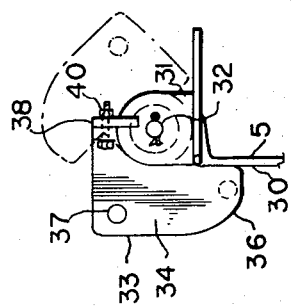
FIG. 1
FIG. 3
INVENTOR
EARL B. THOMPSON, JR.
BY Revere B. Gurley
ATTORNEY

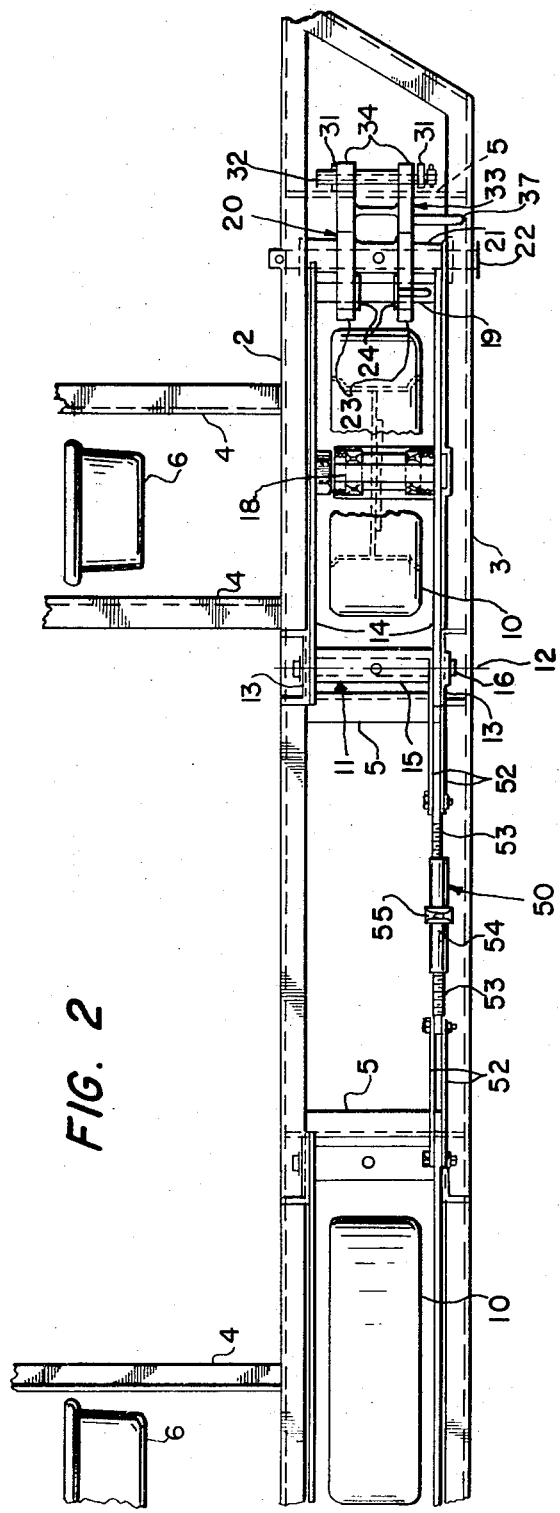
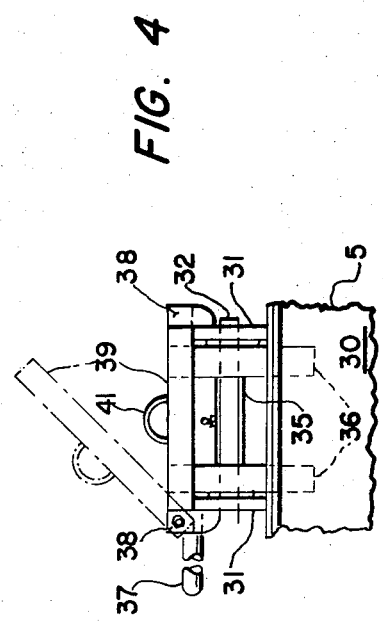

CONVERTIBLE RAIL-HIGHWAY MINE CAR

NATURE AND OBJECTS OF INVENTION

This invention resides in a rail-road mine car provided with flanged wheels for use on rails and road wheels for travel on the ground, the road wheels being raised to idle position or lowered into ground surface engagement.

Mine cars with both rail and road wheels are known, but usually require special tracks or equipment to raise the road wheels out of ground contact for rail operation. For this reason special jacks must be carried, or the road wheels may be raised to inoperative position at only certain places.

It is the object of this invention to mount the road wheels for lifting from the ground into inoperative position without additional equipment. The road wheels are mounted on a structure which may be operated for this purpose at any place without other tools.

Two ground engaging, rubber-tired wheels are mounted on each side of the car, these wheels being journalled on two lever structures, each pivotally attached at one end to the car. Each lever structure is supported by a movable support in either position, this support being movable for operation of the lever structure from one position to the other. A locking member is provided for locking the support in its supporting position. Force applying mechanism connected to both lever structures is operated to raise the lever structures to their upper position.

IN THE DRAWINGS

FIG. 1 is a side elevation of a portion of a mine car with the road wheels attached, parts being broken away to show detailed structures.

FIG. 2 is a top plan view of the structure shown in FIG. 1.

FIG. 3 is a side elevation of a lock member for the end of a lever structure.

FIG. 4 is an end elevation of FIG. 3.

GENERAL DESCRIPTION

The convertible rail-highway mine car embodying this invention has spaced longitudinal side frame members 2, 3 on each side, with transverse frame members 4 extending between the inner longitudinal members 2. Channel members 5 connect the side frame members 2, 3 on each side. Flanged wheels 6 are journalled between adjacent transverse members 4 inwardly of the side frame members 2 for operation on rails. These rail or flanged wheels 6 and their mountings may be of any known type, one of which is shown in the Kersey U.S. Pat. No. 3,353,504.

The road non-flanged wheels 10 for ground operation are mounted on the sides between the longitudinal side frame members 2, 3. Each non-flanged wheel 10 is mounted on a lever structure 11 pivoted at one end at 12 between the side frame members. These side frame members 2, 3 have secured on their top sides opposed, upstanding support members 13. Each lever structure is formed by two spaced lever arms 14 connected at the proximal end by a tubular sleeve 15, through which passes pin 16. This pin extends through support members 13 for pivotal movement of the proximal end of the lever structure 11. The wheel 10 is journalled on a shaft 18 extending between the arms 14 intermediate their ends.

The opposite ends of arms 14 of lever structure 11 are connected by a pin 19. A movable support element 20 is formed to engage pin 19 in the raised position of the lever structure 14 and wheel 10 or in the lowered position with the wheel in contact with the ground. The support element 20 has a tubular sleeve 21 journalled on a pin 22 having its ends fixed in the side members 2, 3. Integral with the tubular sleeve 21 are two spaced parallel flat bars 23 which are normal to the axis of the sleeve 21 and extend upwardly in supporting position.

The bars 23 have horizontal notches 24 adjacent the sleeve 21 opening toward the wheel to receive the pin 19 of the lever structure 11 to support the car on the lever structure and wheel 10. Lowering of the lever structure to engage the pin 19 in the upturned notch 24 will automatically move the support element 20 to vertical position.

When the wheels and lever structures are raised to their upper position, the pin 19 on each lever structure will tilt the support element out of its vertical position. Each support element 23 will automatically move to the vertical position, the bars 23 being formed on their upper ends at 25 to engage pin 19 and support the lever structure in raised position.

A transverse channel member 5 between the two side frame members 2, 3 supports two upright lugs 31 which carry a pin 32. A locking member 33 is formed as two spaced, flat members 34 integrally connected by tube 35 and journalled on the pin 32.

As shown in FIGS. 1 and 3, the locking member 33 engages support element 20 to hold it in supporting position, the flat members 34 having nose portions 36 which extend between the bars 23 of support member 20 and the web 30 of channel member 5 to prevent pivotal movement of support element 20. When the locking member 33 is pivoted out of locking position, as by handle 37, the support element 20 may be moved for raising or lowering of the lever structure and wheel.

The upright lugs 31 have upward projections 38 integral therewith, and a latching bar 39 pivoted at 40 to one of said lugs may be positioned between the projections and locking member 33 to prevent movement of the locking member. A handle 41 is provided for lifting the bar 39 and releasing locking member 33.

The pairs of wheels 10 and lever structures 11 on one side of the car are raised by a force-multiplying mechanism 50. The proximal end of each arm of the lever structure is provided with a fixed angular arm 51 to which the links 52 of mechanism 50 are connected. Oppositely threaded rods 53 connected to links 52 are threaded into a sleeve 54, which may be rotated in either direction by a ratchet handle 55. The lever structures 11 and wheels 10 on each side are quickly raised to their upper position, when locking member 33 is released, by rotating the sleeve 54 by handle 55, applying force to arms 51 and rotating the lever structures about their pivotal connections 12. Stops 56 formed on the upright supports 13 prevent the movement of the lever structure beyond its upper position. When the car has its rail wheels 6 on the rails, the ground engaging wheels 10 may be raised by releasing locking member 33 and operating lever 55. The pin 19 automatically tilts the support member 20 as it moves out of notch 24, the support member returning to its upright support position, with the pin 19 resting on the support member at 25. Locking member 33 then is moved to its locking position to hold support member 20 in support position, and the latching bar 39 secures member 33 in locking position.

When the car is to operate on a road or ground surface, the road wheels may be moved to supporting position by releasing locking bar 39 and locking member 33 to allow support member 20 to move out of support position, so the wheels 10 may be lowered. When the lever structures are lowered, the pin 19 engages in upturned notch 24 and moves the support member 20 to its support position. Locking member 33 will lock the support member 20 the same as when the wheels are raised.

I claim:

1. In a convertible rail-highway car having flanged wheels and transversely positioned non-flanged wheels for alternate operation on rails and on ground surfaces, a pair of lever structures pivotally attached at their proximal ends to the car on each side with their proximal ends nearest each other, a non flanged wheel journalled on each lever structure for raising and lowering between upper idle position and lower ground engaging position, force applying mechanism connected between said pair of lever structures for simultaneously raising said structures and wheels to the upper position, a pivoted support member for each lever structure having means to engage and support said lever structure in either upper or lower position thereof when said support member is in a supporting position, each of said support members being movable out of supporting position to enable shifting each said lever structure and wheel between said upper and lower positions and back to said supporting position to support said lever structure in either position, and a pivoted locking member movable to lock each support member in a supporting position.

2. In a convertible rail-highway mine car as claimed in claim 1, in which said pivoted support member is biased to support position and is automatically moved out of supporting position upon raising of said lever structure, said pivoted support member returning to supporting position automatically to engage and support said lever structure in raised position.

3. In a convertible rail-highway car having flanged wheels and transversely positioned non-flanged wheels for alternate operation on rails and ground surfaces, a pair of lever structures pivotally attached at their proximal ends to the car on one side with their proximal ends nearest each other, a non-flanged wheel journalled on each lever structure intermediate its ends for raising and lowering between upper idle and lower ground engaging positions, pivoted support member for each lever structure pivoted on a horizontal axis for movement into and out of a supporting position and having means to engage and support the distal end of its respective lever structure in either upper or lower position when said pivoted support member is in a supporting position, a pivoted locking member engaging said support member to lock the latter in supporting position to support said lever structure in either raised or lowered position, said pivoting member when released being movable out of engagement with said lever structure for movement of said lever structure and wheel between raised and lowered position, a pivoted latching bar to prevent movement of said locking member out of locking position, each of said lever structures having an arm projecting at an angle from its proximal end, and a force applying mechanism connected between the arms of said lever structures and operable to shift said lever structures and wheels to raised position.

4. In a convertible rail-highway mine car as claimed in claim 3, in which each said pivoted support member has a horizontally opening notch in supporting position receiving an element on said lever structure, said latter element rotating said pivoted support member when said lever structure is raised to turn said notch upwardly and allow upward movement of said lever structure.

5. In a convertible rail-highway mine car as claimed in claim 4, in which each said pivoted support member is biased toward support position, said lever structure when raised rotating said pivoted support member out of supporting position, said pivoted support member returning to supporting position automatically to engage and support said lever structure in raised position.

* * * * *